United States Patent
Stallings et al.

(10) Patent No.: US 11,714,523 B2
(45) Date of Patent: *Aug. 1, 2023

(54) DIGITAL IMAGE TAGGING APPARATUSES, SYSTEMS, AND METHODS

(71) Applicant: Verizon Patent and Licensing Inc., Basking Ridge, NJ (US)

(72) Inventors: Heath Stallings, Colleyville, TX (US); James Y. Hwang, Jersey City, NJ (US); Shadman Zafar, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/162,391

(22) Filed: Jan. 29, 2021

(65) Prior Publication Data

US 2021/0181902 A1    Jun. 17, 2021

Related U.S. Application Data

(63) Continuation of application No. 15/967,517, filed on Apr. 30, 2018, now Pat. No. 10,928,981, which is a continuation of application No. 14/336,946, filed on Jul. 21, 2014, now Pat. No. 9,977,570, which is a continuation of application No. 12/165,414, filed on Jun. 30, 2008, now Pat. No. 8,788,493.

(51) Int. Cl.
| | | |
|---|---|---|
| G06F 16/50 | (2019.01) | |
| G06F 3/0482 | (2013.01) | |
| G06F 16/58 | (2019.01) | |
| H04N 23/63 | (2023.01) | |
| H04N 23/80 | (2023.01) | |
| H04N 23/661 | (2023.01) | |
| G06V 40/16 | (2022.01) | |

(52) U.S. Cl.
CPC ............ *G06F 3/0482* (2013.01); *G06F 16/58* (2019.01); *H04N 23/63* (2023.01); *H04N 23/635* (2023.01); *H04N 23/661* (2023.01); *H04N 23/80* (2023.01); *G06V 40/179* (2022.01)

(58) Field of Classification Search
CPC .......... H04N 5/23206; H04N 5/23229; H04N 5/23293; G06F 3/048; G06F 16/58
See application file for complete search history.

(56) References Cited

U.S. PATENT DOCUMENTS

7,653,600 B2    1/2010  Gustin et al.
7,783,980 B1    8/2010  Herold
(Continued)

OTHER PUBLICATIONS

"How to Share Photos on Facebook", "How to Share Photos on Facebook," eHow, Inc., http://web.archive.org/web/20080103035709/http://www.ehow.com/how_2031198_share-photos-facebook.html, three pages, retrieved from the internet on Dec. 27, 2012.

(Continued)

*Primary Examiner* — Tarek Chbouki

(57) ABSTRACT

In an exemplary embodiment, user input is received, a selected portion of a digital image is identified based on the user input, a data instance is selected, and a tag is applied to the selected portion of the digital image. The applied tag provides an association between the selected portion of the digital image and the data instance. In certain examples, a visual indicator representative of the tag is provided for display together with the tagged digital image.

20 Claims, 17 Drawing Sheets

(56) References Cited

U.S. PATENT DOCUMENTS

| | | |
|---|---|---|
| 7,847,729 B2 | 12/2010 | Tysowski et al. |
| 7,991,194 B2 | 8/2011 | Kim et al. |
| 8,484,564 B1 | 7/2013 | Marti et al. |
| 9,241,056 B2 | 1/2016 | Lonn |
| 2003/0187880 A1 | 10/2003 | Brexel et al. |
| 2005/0102609 A1 | 5/2005 | Izume et al. |
| 2005/0278371 A1 | 12/2005 | Funk et al. |
| 2006/0080286 A1 | 4/2006 | Svendsen |
| 2006/0197763 A1 | 9/2006 | Harrison et al. |
| 2007/0258642 A1 | 11/2007 | Thota |
| 2008/0033903 A1 | 2/2008 | Carol et al. |
| 2008/0077595 A1 | 3/2008 | Leebow |
| 2008/0195657 A1 | 8/2008 | Naaman et al. |
| 2008/0240702 A1 | 10/2008 | Wassingbo et al. |
| 2008/0268876 A1* | 10/2008 | Gelfand .................. H04W 4/02 455/457 |
| 2008/0278438 A1 | 11/2008 | Brown et al. |
| 2009/0006484 A1 | 1/2009 | Wang |
| 2009/0077089 A1 | 3/2009 | Safo et al. |
| 2009/0089322 A1 | 4/2009 | Naaman |
| 2009/0167509 A1* | 7/2009 | Fadell ...................... G08B 6/00 340/407.2 |
| 2009/0279794 A1 | 11/2009 | Brucher et al. |
| 2009/0300500 A1 | 12/2009 | Arrasvuori |
| 2009/0316961 A1 | 12/2009 | Gomez Suarez et al. |

OTHER PUBLICATIONS

Lee, et al., "A Scalable Service for Photo Annotation, Sharing, and Search", Lee, et al., "A Scalable Service for Photo Annotation, Sharing, and Search," Proceedings of the 14th Annual ACM International Conference on Multimedia (MULTIMEDIA '06), pp. 699-722, Oct. 2006.

* cited by examiner

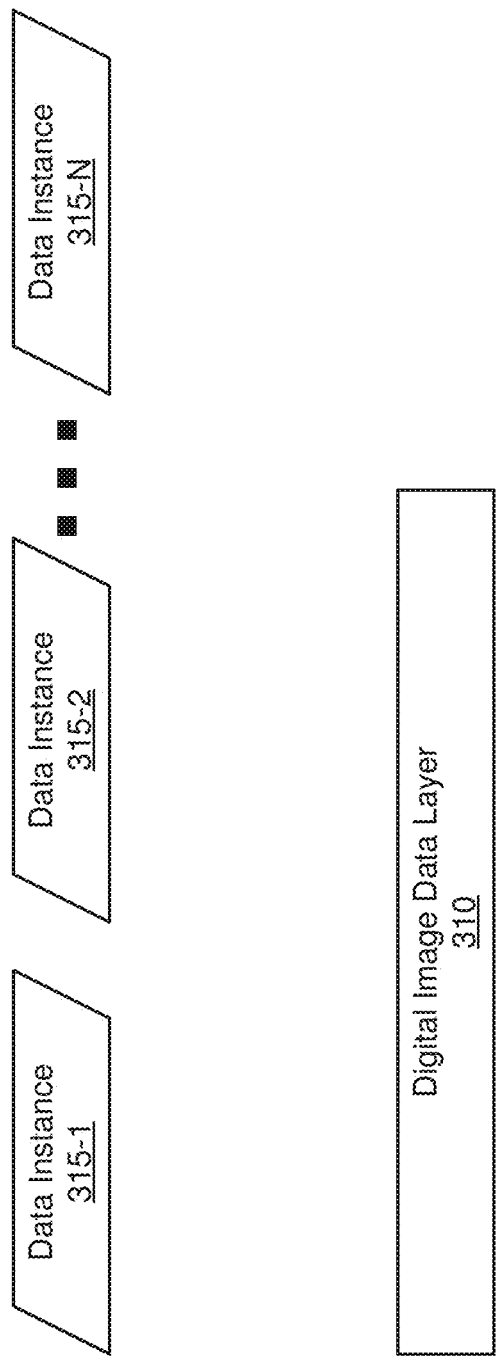

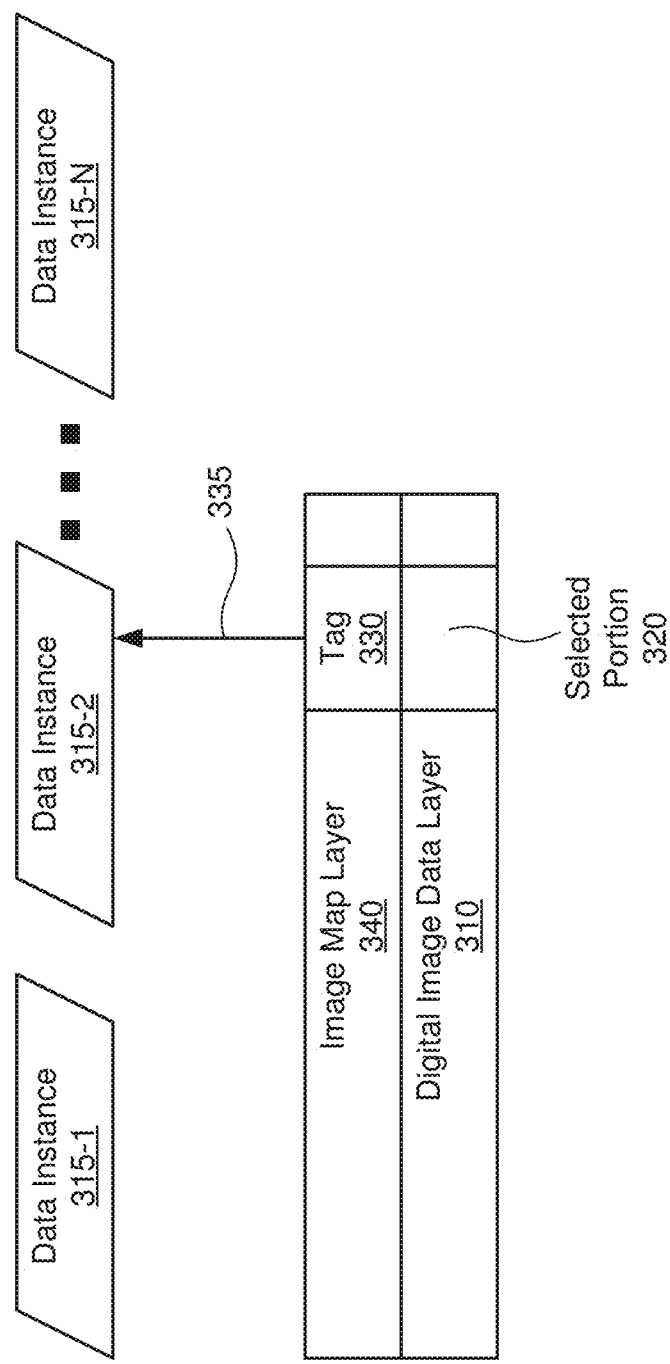

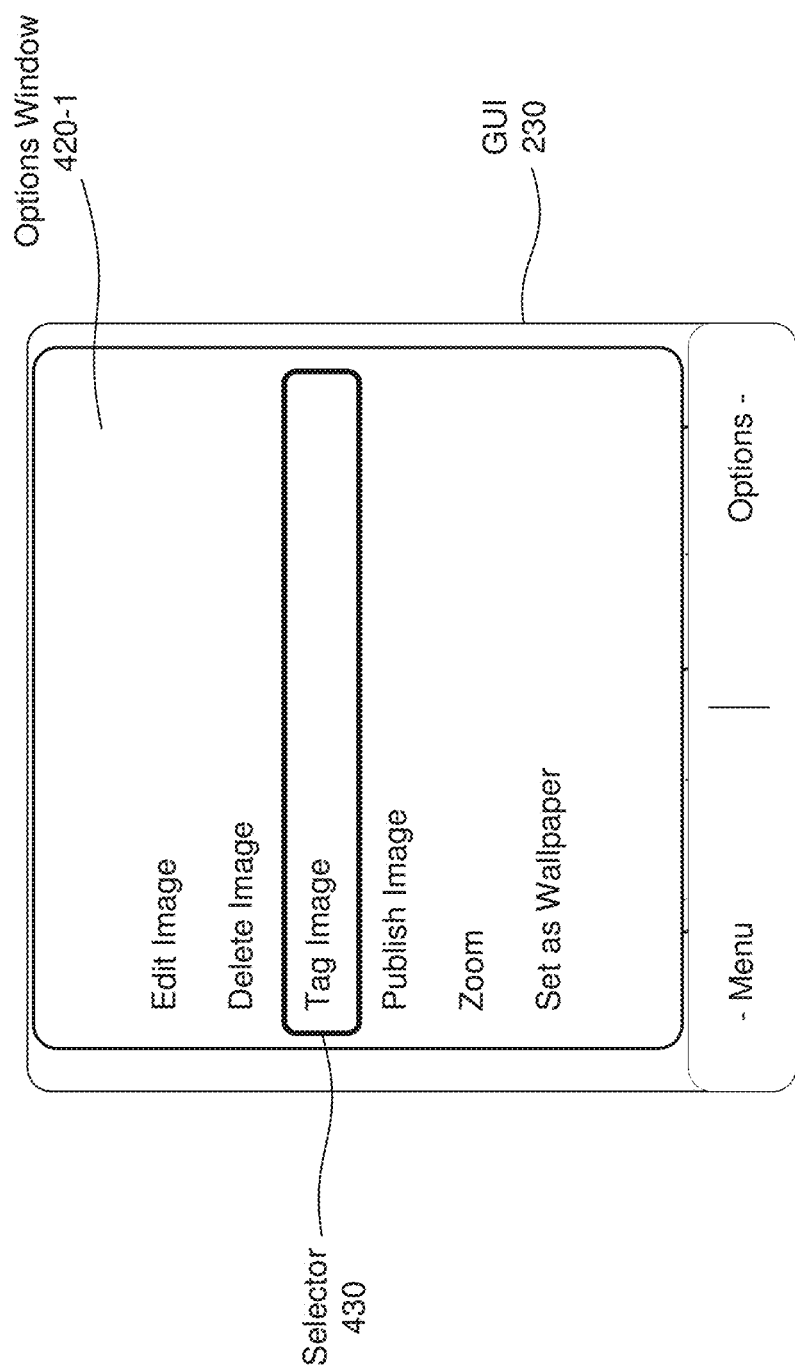

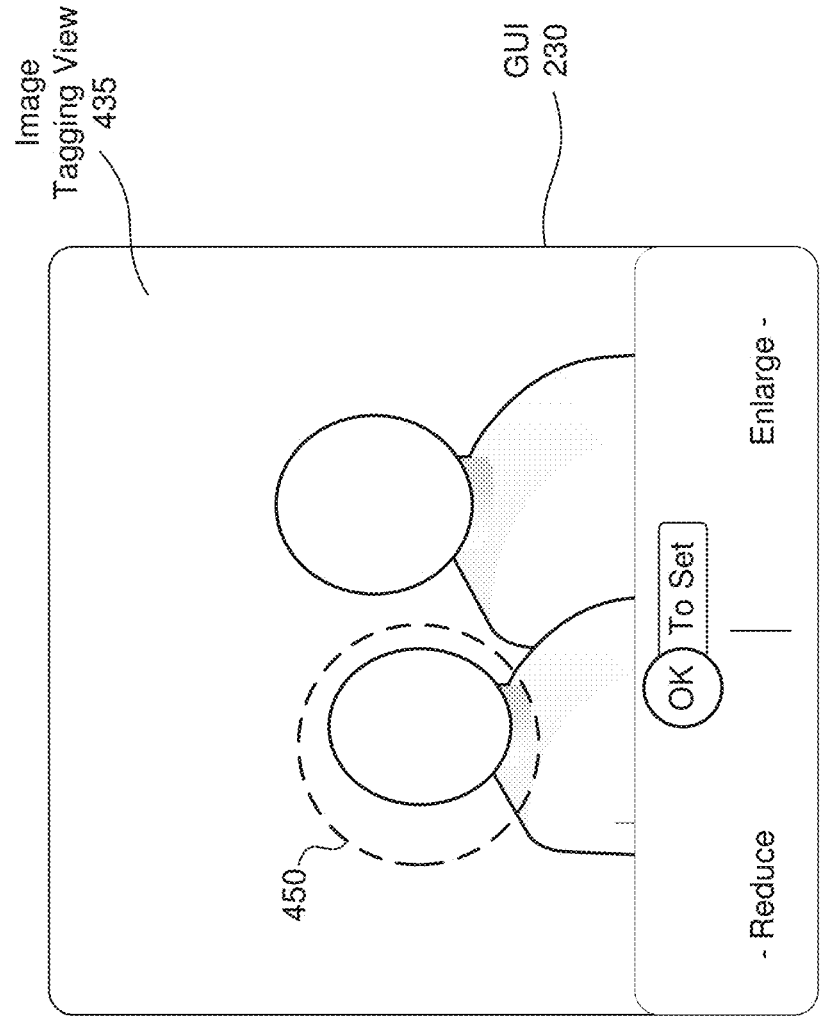

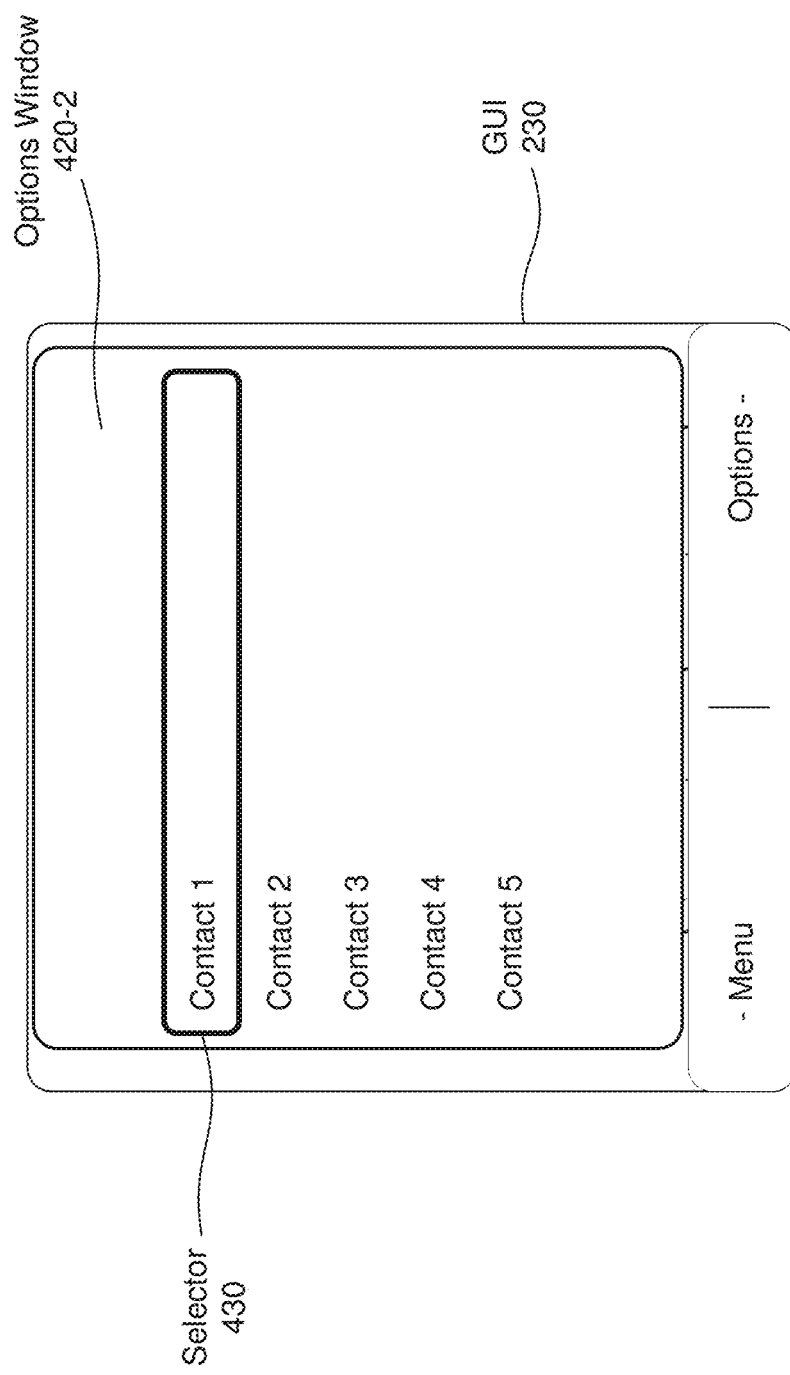

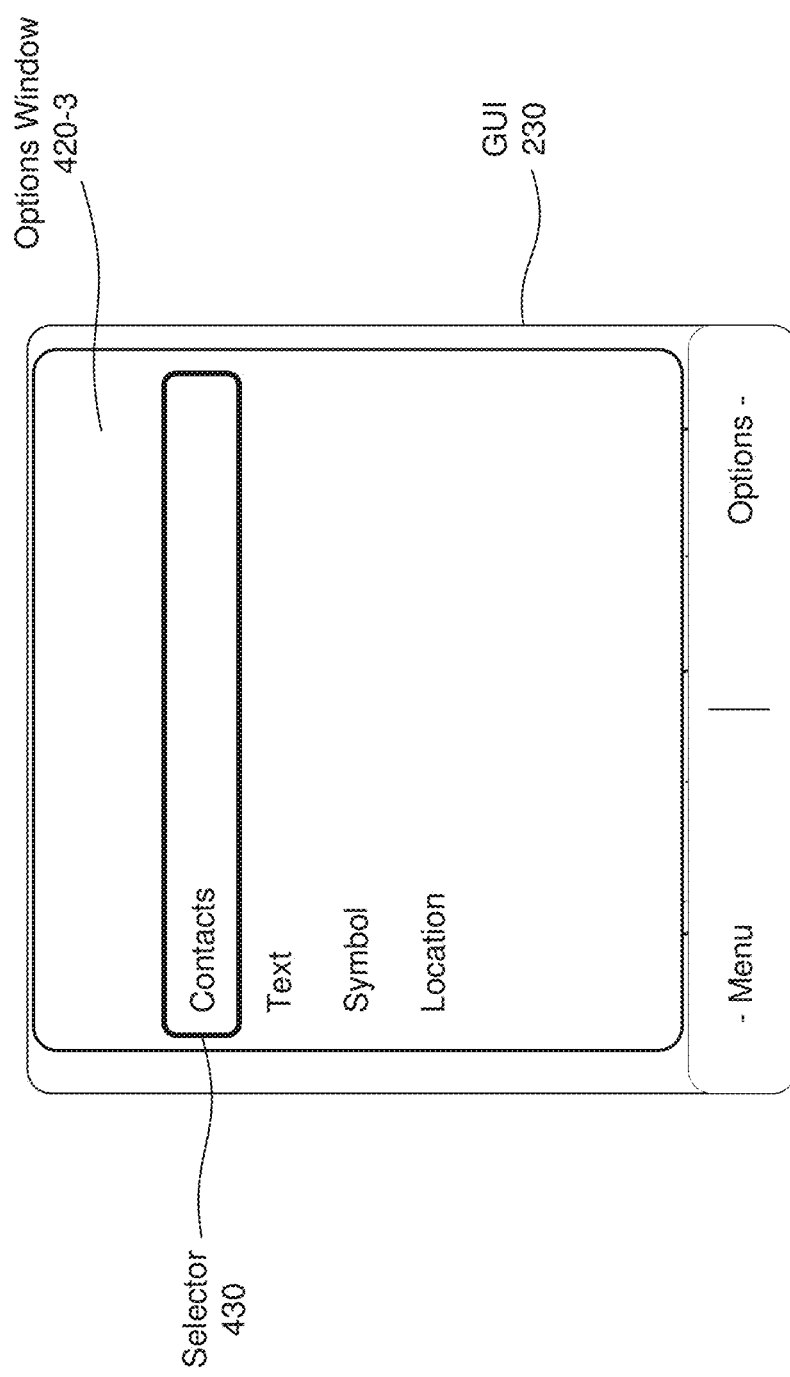

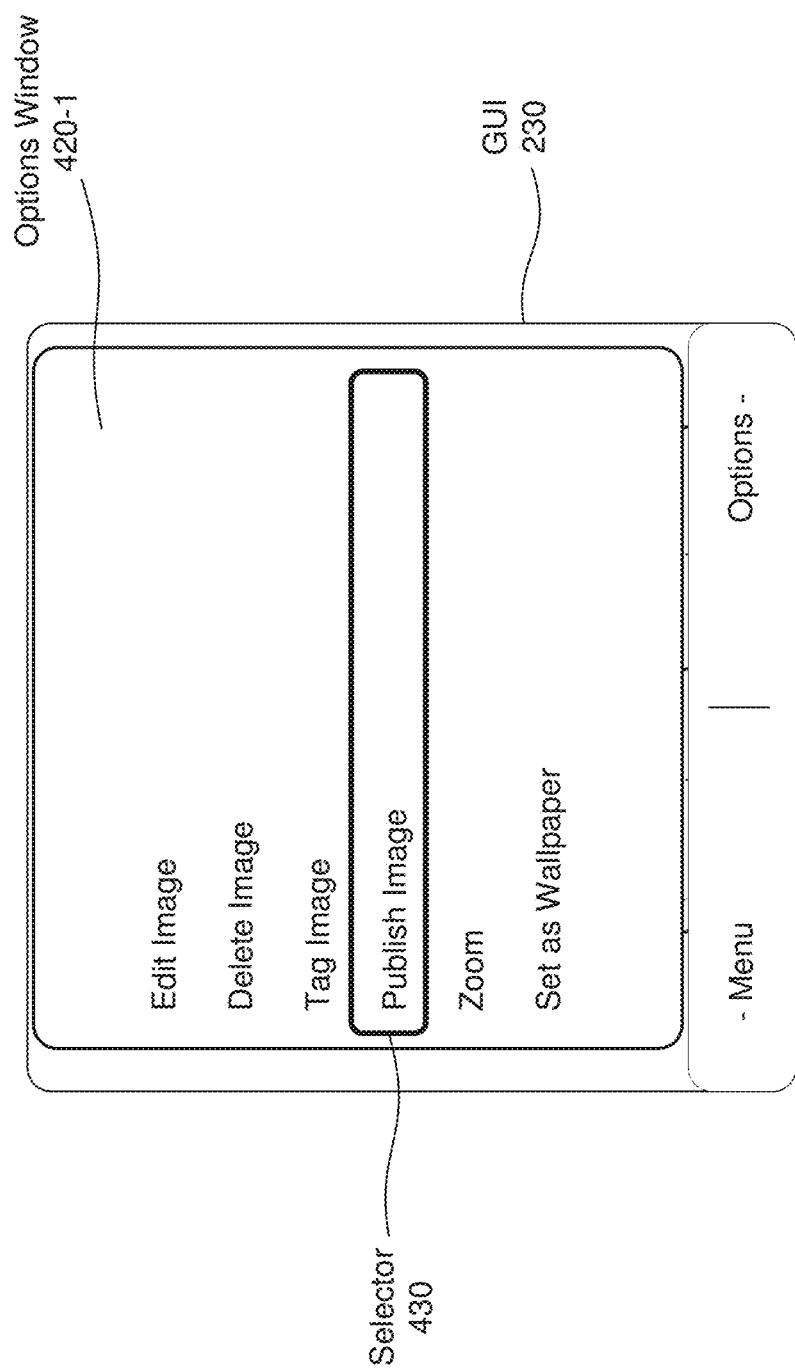

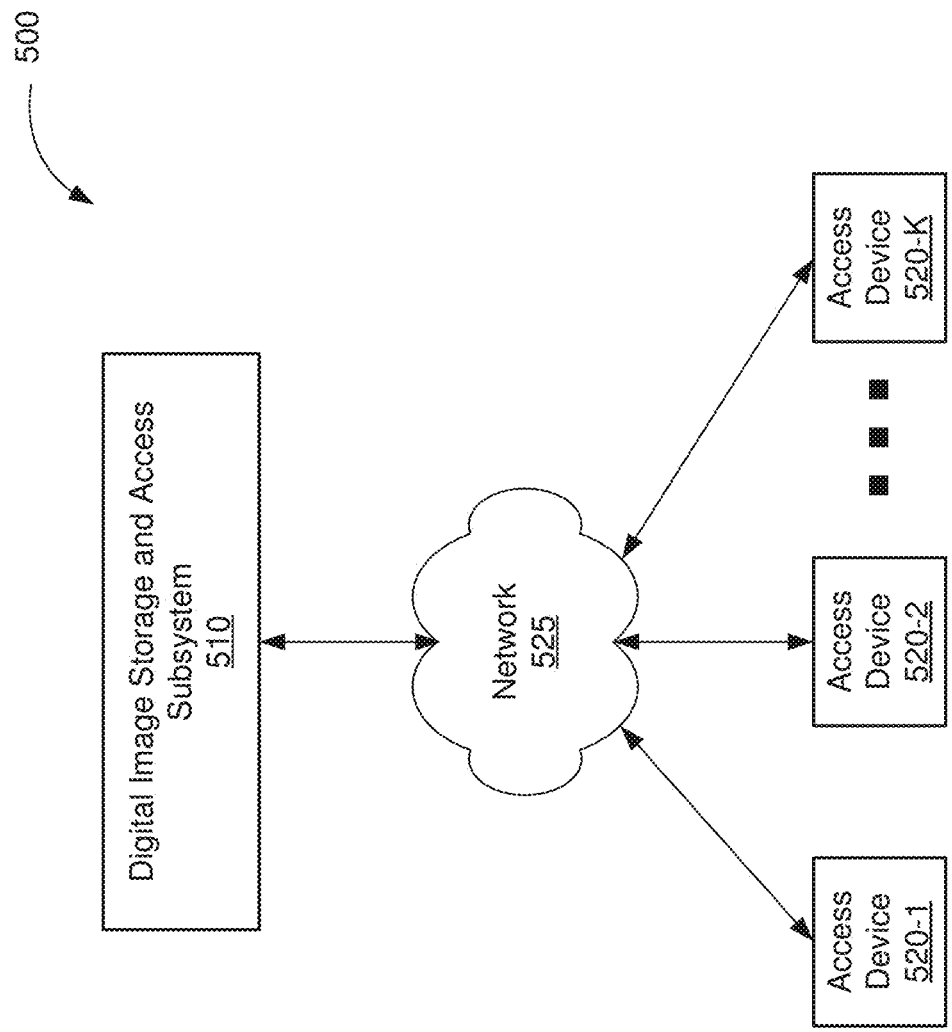

DIGITAL IMAGE TAGGING APPARATUSES, SYSTEMS, AND METHODS

RELATED APPLICATIONS

This application is a continuation application of U.S. patent application Ser. No. 15/967,517, filed Apr. 30, 2018, which application is a continuation of U.S. patent application Ser. No. 14/336,946, filed Jul. 21, 2014 and issued as U.S. Pat. No. 9,977,570 on May 22, 2018, which application is a continuation application of U.S. patent application Ser. No. 12/165,414, filed Jun. 30, 2008 and issued as U.S. Pat. No. 8,788,493 on Jul. 22, 2014. These applications are hereby incorporated by reference in their entirety.

BACKGROUND INFORMATION

As digital picture technologies have progressed, the creating, storing, and sharing of digital pictures has become commonplace in society. For example, many users of digital cameras and other digital imaging devices have amassed large electronic libraries of digital pictures. However, conventional digital picture management and sharing applications, especially applications provided on relatively small form-factor devices such as mobile phones, tend to be un-intuitive, short on features, and difficult to use. Accordingly, there remains room for improvement in digital picture management and user interface applications.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 3A-C illustrate an exemplary digital image tagging process and data layer structure.

FIGS. 4A-4I illustrate exemplary graphical user interface views that may be displayed in a graphical user interface ("GUI").

FIG. 5 illustrates an exemplary digital image publishing and access system.

DETAILED DESCRIPTION OF PREFERRED EMBODIMENTS

Exemplary digital image tagging apparatuses, systems, and methods are described herein.

In an exemplary embodiment, user input is received, a selected portion of a digital image is identified based on the user input, and a tag is applied to the selected portion of the digital image. The applied tag provides an association between the selected portion of the digital image and a data instance. In certain embodiments, application of the tag includes generating an image map that maps the selected portion of the digital image to the tag. For example, the application of the tag may include inserting data representative of the tag in metadata associated with the digital image. In certain embodiments, the tag includes a link (e.g., a hyperlink) to the data instance.

In certain embodiments, the tag may include a visual indicator configured to be displayed together with a digital image in a digital image view of a graphical user interface ("GUI"). The visual indicator may include a selectable object in the digital image view. A component of the visual indicator may visually indicate the selected portion of the digital image to which the tag is applied.

In certain embodiments, various GUI views may be displayed in a GUI and may be configured to enable a user to interact with digital image tagging tools, features, and functionality. In some examples, the GUI may include an image tagging view and/or other tool(s) configured to enable a user to provide user input defining the selected portion of the digital image and/or defining the tag to be applied to the selected portion of the digital image.

In certain exemplary embodiments, data representative of a tagged digital image is published to a digital image storage and access subsystem over a network. The digital image storage and access subsystem may be configured to store and provide a plurality of access devices with access to tagged digital images. In some examples, various users may access a tagged digital image and provide user input defining additional tags to be applied to the digital image. In some such examples, tags may be defined by various users, applied to a digital image, and used to create one or more conversation threads between the users.

Exemplary embodiments of digital image tagging apparatuses, systems, and methods will now be described in more detail with reference to the accompanying drawings.

Figure 1:
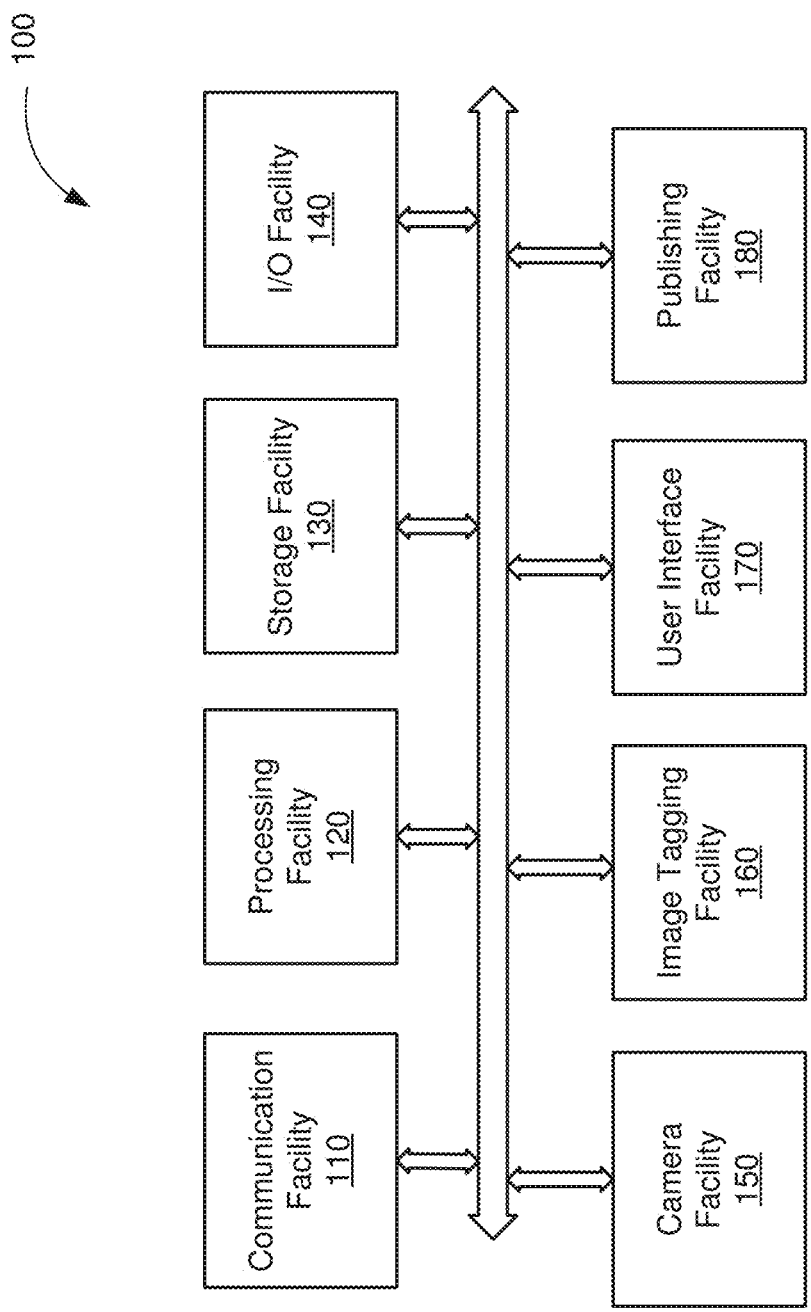
FIG. 1 illustrates an exemplary digital image tagging system.

FIG. 1 illustrates an exemplary digital image tagging system 100 (or simply "system 100"). As shown in FIG. 1, system 100 may include a communication facility 110, processing facility 120, storage facility 130, input/output ("I/O") facility 140, camera facility 150, image tagging facility 160, user interface facility 170, and publishing facility 180 communicatively connected to one another. The facilities 110-180 may be communicatively connected using any suitable technologies and may communicate using any communication platforms and/or technologies suitable for transporting communications and data (e.g., image and/or tag data) between the facilities 110-180, including well known communication platforms and technologies.

In some examples, system 100 may include any computing hardware and/or instructions (e.g., software programs), or combinations of computing instructions and hardware, configured to perform the processes described herein. In particular, it should be understood that system 100 or components of system 100 may be implemented on one physical computing device or may be implemented on more than one physical computing device. Accordingly, system 100 may include any one of a number of well known computing devices, and may employ any of a number of well known computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the facilities 110-180 may be implemented as hardware, computing instructions (e.g., software) tangibly embodied on a computer-readable medium, or a combination of hardware and tangibly embodied computing instructions configured to perform one or more of the processes described herein. In certain embodiments, for example, image tagging facility 160, user interface facility 170, and/or one or more other facilities may be implemented as one or more software applications embodied on a computer-readable medium, such as storage facility 130 or other memory, and configured to direct processing facility 120 to execute one or more of the processes described herein.

The components of system 100 shown in FIG. 1 are illustrative only. Other embodiments may add, omit, or reconfigure one or more components. Each of the facilities 110-180 will now be described in more detail.

Communication facility 110 may be configured to send and/or receive communications to/from one or more external devices (e.g., a server). Communication facility 110 may include and/or employ any device, logic, communication media, communication protocols, and/or other technologies suitable for transmitting and receiving communications and data, including data representative of digital images (e.g., photos) and/or publishing commands and data. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, and other suitable communications networks and technologies.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by communication facility 110.

Storage facility 130 may include one or more data storage media, devices, or configurations and may employ any type, form, and combination of storage media. For example, the storage facility 130 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of digital images, tags, and/or image metadata, may be temporarily and/or permanently stored in the storage facility 130.

I/O facility 140 may be configured to receive user input and provide user output and may include any hardware, firmware, software, or combination thereof supportive of input and output capabilities. For example, I/O facility 140 may include one or more devices for capturing user input, including, but not limited to, a microphone, speech recognition technologies, keyboard or keypad, touch screen component, receiver (e.g., an RF or infrared receiver), and one or more input buttons.

I/O facility 140 may include one or more devices for presenting output to a user, including, but not limited to, a graphics engine, a display (e.g., a display screen), one or more display drivers, one or more audio speakers, and one or more audio drivers. Output may include audio, visual (e.g., digital images), textual, and/or haptic output. In certain embodiments, for example, I/O facility 140 is configured to display a graphical user interface ("GUI") for viewing by a user. Exemplary GUI views that may be displayed by I/O facility 140 are described further below.

Camera facility 150 may include any combination of hardware, software, and/or firmware configured to capture digital images. Digital images captured by camera facility 150 may be referred to as "camera images." Camera facility 150 may include a still-shot camera, video camera, and/or components of a camera such as a camera lens, camera sensor, etc. These and/or any other suitable camera technologies and devices may be employed by camera facility 150. Accordingly, camera facility 150 may capture one or more digital images, including generating data representative of the digital camera images (i.e., digital image data). Data representative of digital images may be provided to one or more other facilities 110-140 and 160-180 for processing and/or storage. For example, digital image data may be temporarily or permanently stored in storage facility 130. A digital image may include data representative of one or more images, including, but not limited to, a photograph, picture, video, or other collection of image frames. In certain embodiments, data representative of a digital image includes an image data file in any suitable file format such as, but not limited to, JPEG, BMP, TIFF, RAW, PNG, and/or GIF formats.

Image tagging facility 160 may be configured to identify a selected portion of a digital image and apply a tag to the selected portion of the digital image. In certain embodiments, the selected portion of the digital image may be identified and the tag may be applied based on user input defining the selected portion and/or the tag. Exemplary tags and application of a tag to a selected portion of a digital image are described further below.

User interface facility 170 may be configured to generate one or more user interfaces. For example, a GUI including one or more GUI views may be generated and provided to I/O facility 140 for display. Exemplary GUI views, including GUI views related to defining a selected portion of a digital image and a tag to be applied to the selected portion of the digital image, are described further below.

Publishing facility 180 may be configured to execute, or direct execution of, one or more operations for publishing digital images, including tagged digital images. Publishing may include, but is not limited to, providing one or more digital images to I/O facility 140 for display, to communication facility 110 for transmission to an external device or devices for storage and/or access, and/or to an external service or platform (e.g., a social networking website) for display. An example of publishing a tagged digital image is described further below.

Figure 2:
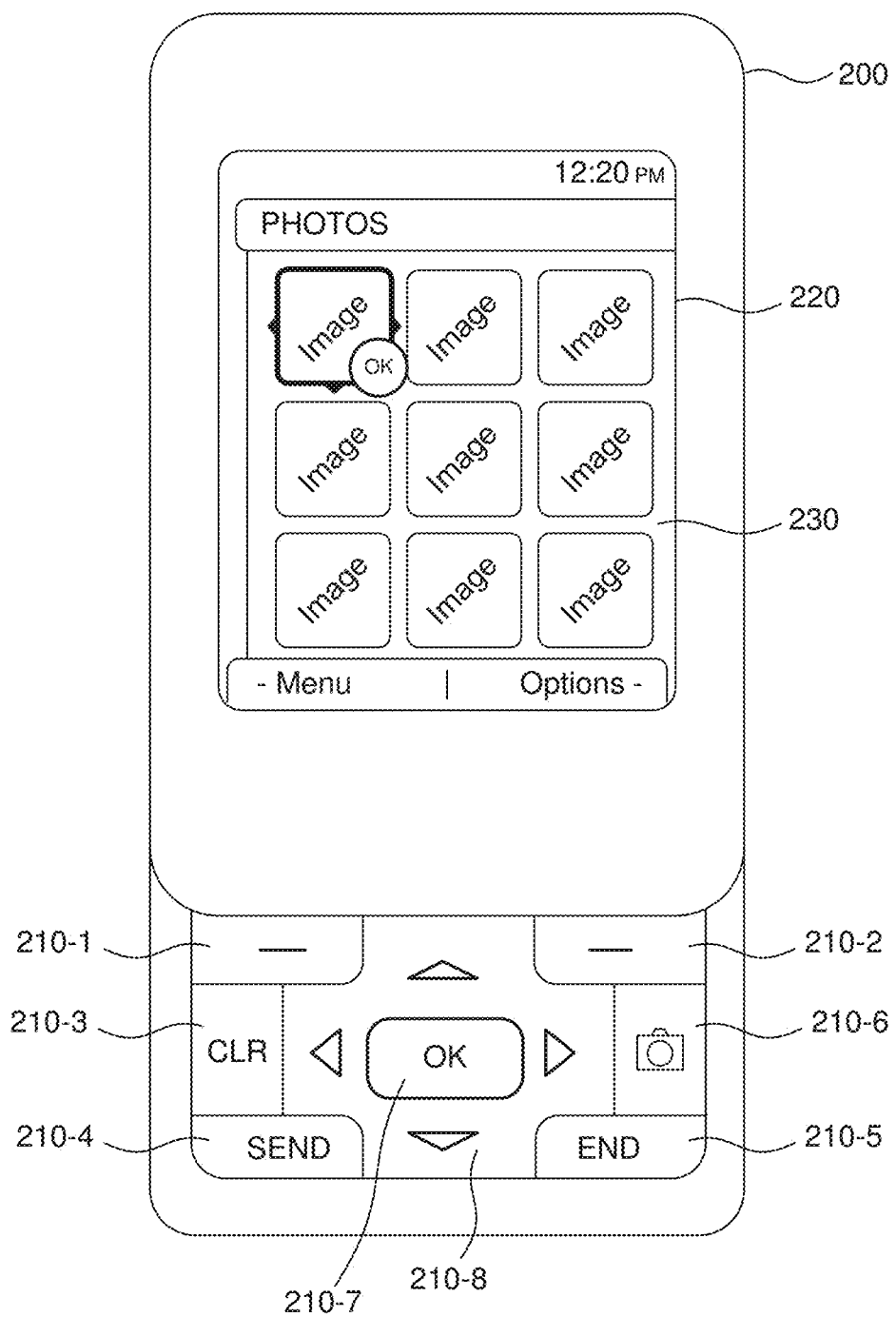
FIG. 2 illustrates an exemplary mobile device having the system of FIG. 1 implemented therein.

System 100 may be implemented in a variety of ways and as may suit a particular application. FIG. 2 illustrates an exemplary mobile device 200 having system 100 implemented therein. Mobile device 200 may include one or more of the facilities 110-180 shown in FIG. 1 and may be configured to perform one or more of the processes and/or operations described herein. In certain embodiments, mobile device 200 comprises a mobile phone device such as a mobile phone having a built-in digital camera.

Implementation of system 100 in mobile device 200 is illustrative only. In other embodiments, system 100 may include or be implemented in other devices or types of devices, including, but not limited to, a computing device (e.g., a desktop or laptop computer), a communication device (e.g., a telephone, a network access device, a wireless computing device, a wireless communication device, a personal digital assistant, a camera, a set-top box, and any other device configured to perform one or more of the image tagging processes described herein.

As shown in FIG. 2, mobile device 200 may include a plurality of input buttons 210-1 through 210-8 (collectively "input buttons 210"), which may be actuated by a user to provide input to the mobile device 200. Exemplary input buttons may include "soft" and/or "hard" coded input buttons. "Soft" coded buttons may be dynamically associated with different user input commands and/or operations based on the context of operations of the mobile device 200, and "hard" coded buttons may be statically associated with corresponding user input commands and/or operations of the mobile device 200. FIG. 2 illustrates mobile device 200 including "soft" input buttons 210-1 and 210-2. Operations associated with "soft" input buttons 210-1 and 210-2 may be indicated to a user. FIG. 2 shows a visually indicated "menu" operation and "options" operation as being associated with "soft" input buttons 210-1 and 210-2, respectively. Mobile device 200 further includes a "clear" ("CLR") input button 210-3, a "SEND" input button 210-4, an "END" input button 210-5, a camera mode input button 210-6, a selector button 210-7, and one or more directional (e.g., "up", "down," "left," and "right") input buttons 210-8.

A user of mobile device 200 may utilize one or more of the input buttons 210 to provide user input for mobile device operations. For example, camera mode input button 210-6 may be actuated to activate or terminate operation of a camera mode on mobile device 200. When the camera mode is active, camera facility 150 may operate in a state configured for capturing camera images. As another example, directional input buttons 210-8 may be used to navigate a visual selector within a GUI and highlight or otherwise indicate specific selectable items in the GUI. Selector button 210-7 may be used to select one or more highlighted items and thereby activate one or more operations associated with the selected item(s).

As shown in FIG. 2, mobile device 200 may include a display 220 configured to display a graphical user interface 230 ("GUI 230") for viewing by a user of mobile device 200. Display 220 may be included in I/O facility 140 and may include a display screen on which GUI 230 is displayed. Examples of GUI 230 and various views that may be displayed in GUI 230 are described in detail further below.

Figure 3B:
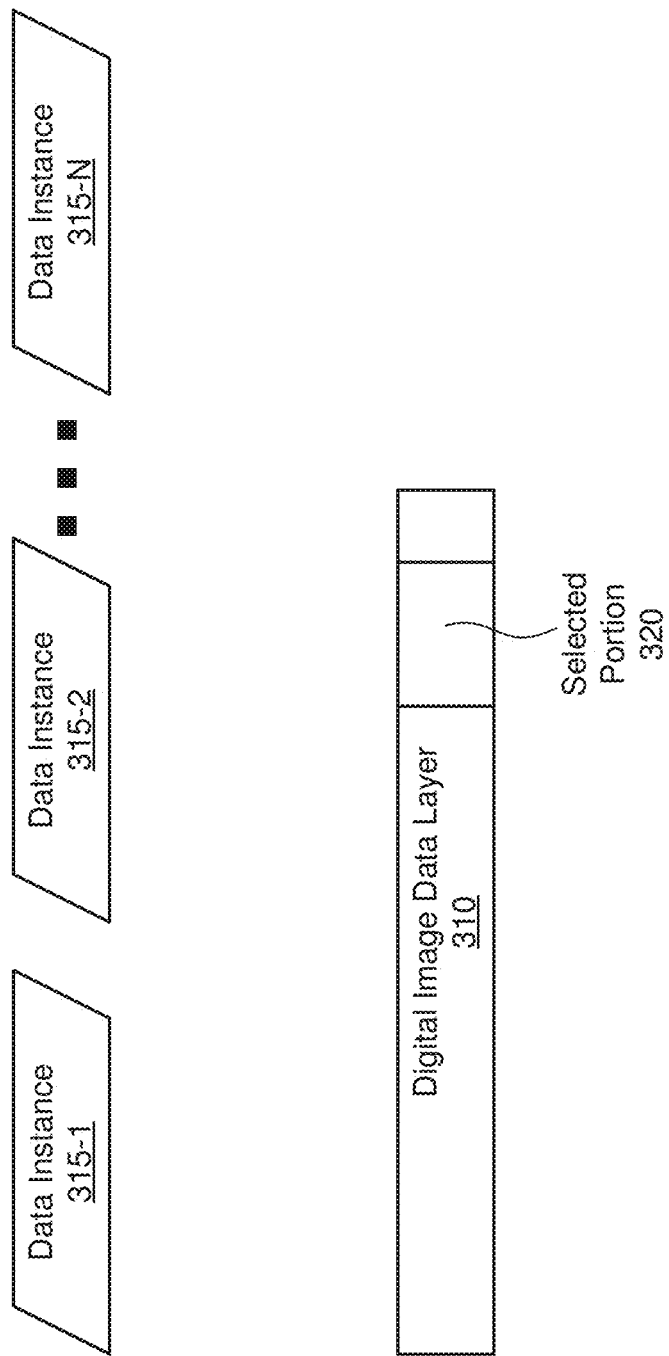

To help facilitate an understanding of image tagging facility 160 and image tagging operations, FIGS. 3A-3C illustrate, from a data layer perspective, an exemplary application of a tag to a selected portion of a digital image. FIG. 3A illustrates a digital image data layer 310, which may include data representative of a digital image. For example, digital image data layer 310 may include data representative of a digital picture file stored in storage facility 130 or another data storage facility.

FIG. 3A further illustrates a plurality of data instances 315-1 through 315-N (collectively "data instances 315"). Data instances 315 may include any electronically stored information that may be associated with a tag, including, but not limited to, a contact record and/or information included in a contacts database, textual data, visual indicators, service identifiers (e.g., a graphical symbol for a social network site or service), and graphical objects. A data instance 315 may include a discrete data object and/or any information included in a discrete data object. A data instance 315 may exist before or be generated in conjunction with definition of a tag.

FIG. 3A represents a data layer configuration before a tag is applied to a selected portion of a digital image. FIGS. 3B-3C represent data layer configurations during performance of an image tagging process. FIG. 3B illustrates digital image data layer 310 when a portion 320 of the corresponding digital image has been selected. Selection of portion 320 may include a user providing input defining selected portion 320 of the digital image, and image tagging facility 160 identifying the selected portion 320 as a portion of the digital image to which a tag may be applied based on the user input.

The selected portion 320 of the digital image may include any subset of data representing the digital image, e.g., a subset of digital image data layer 310 as shown in FIG. 3B. In certain embodiments, a selected portion 320 includes an area space that is a subset of the total area space associated with a visible frame of the digital image.

A selected portion 320 of a digital image may be represented in any suitable way. As an example, one or more pixels positioned within a certain area may be marked to define a selected portion 320, or one or more particular pixels may be marked and used together with one or more geometric equations to define a particular area or shape (e.g., corners of a rectangular area or center point of a circle).

FIG. 3C illustrates a data layer configuration when a tag 330 is applied to a selected portion 320 of a digital image. Tag 330 may include any data and/or data structure associating a selected portion 320 of a digital image to one or more data instances 315. The association may be defined in any suitable way, such as by tag 330 including data pointing to the selected portion 320 of a digital image and to one or more of the data instances 315.

Tag 330 may be applied to and thereby associated with the selected portion 320 of the digital image in any suitable way, such as by creating tag 330 to include data mapping the tag 330 to, or otherwise associating tag 330 with, the selected portion 320 of the digital image. In certain embodiments, data representative of the tag 330 may be inserted in the digital image metadata and may associate the tag 330 with the selected portion 320 of the digital image. In FIG. 3C, application of tag 330 to the selected portion 320 of the digital image is graphically illustrated as tag 330 being positioned on top of the selected portion 320 of the digital image.

In FIG. 3C, tag 330 is associated with data instance 315-2. Tag 330 may be associated with data instance 315-2 in any suitable way. For example, tag 330 may be defined to include data representative of a link 335 to data instance 315-2 (e.g., a pointer or a hyperlink to a data location associated with data instance 315-2). Accordingly, tag 330 may be configured to map the selected portion 320 of a digital image to one or more of the data instances 315.

While FIG. 3C shows tag 330 providing a link 335 to data instance 315-2, in other embodiments, tag 330 may include one or more data instances 315 integrated therein. For example, data instance 315-2, or a copy of data instance 315-2, may be incorporated within tag 330.

As shown in FIG. 3C, tag 330 may be included in an image map layer 340, which may include data representative of an image map associated with a digital image. The image map may include one or more tags 330 configured to map one or more selected portions 320 of the digital image to one or more of the data instances 315, as described above. In certain embodiments, image map layer 340 may be viewed as being positioned on top of digital image data layer 310 as shown in FIG. 3C. In certain embodiments, data representative of the image map may be incorporated in digital image metadata.

When tag 330 is applied to the selected portion 320 of digital image, an image map may be generated and tag 330 may be stitched in or otherwise included in the image map. The image map may be updated to include other tags linking other selected portions of the digital image to one or more data instances 315. Accordingly, an image map may be generated and/or updated and may include one or more tags 330 configured to map one or more selected portions 320 of a digital image to one or more data instances 315.

Image tagging facility 160 and/or user interface facility 270 may provide one or more tools configured to enable a user (e.g., a user of mobile device 200) to provide user input defining selected portions 320 of digital images, as well as tags 320 to be applied to the selected portions 320. With the tools, a user of mobile device 200 may define, create, modify, delete, name, search, access, view, and otherwise manage or process tags 320 associated with selected portions 320 of a digital image.

To help facilitate an understanding of user interface facility 170 and an exemplary user interface provided by user interface facility 170 for tagging digital images, FIGS. 4A-4I illustrate exemplary GUI views that may be generated and provided by user interface facility 170 for display.

Figure 4A:
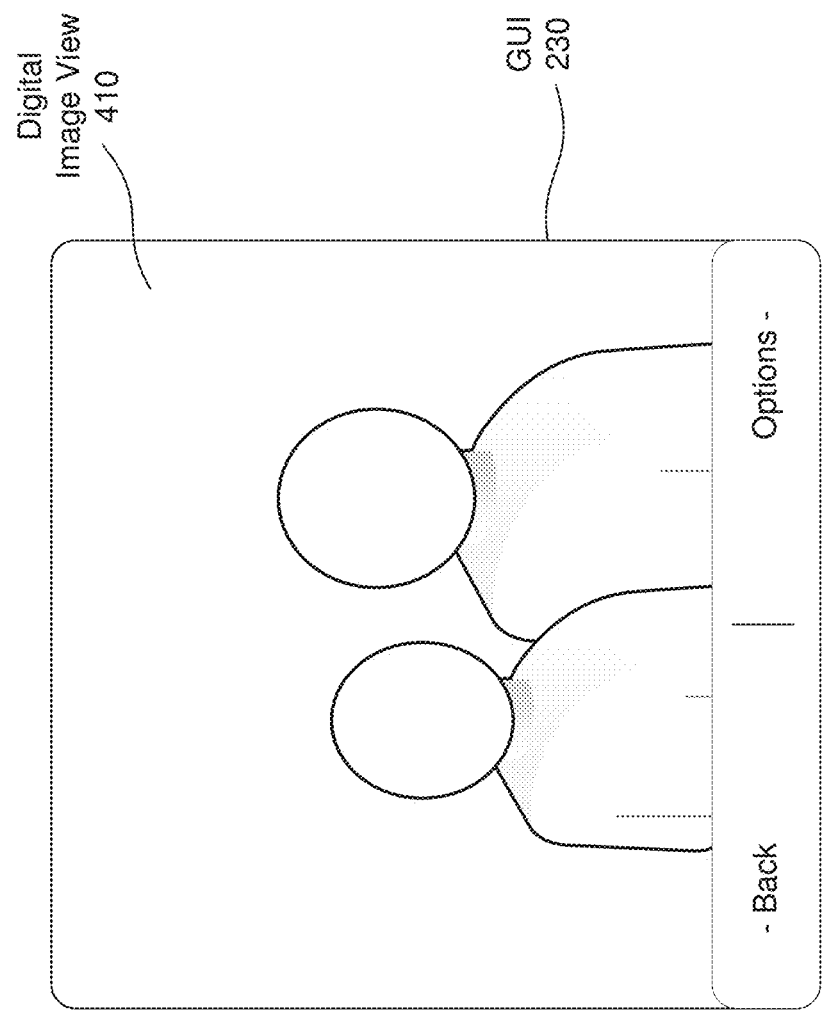

FIG. 4A illustrates GUI 230 having a digital image view 410 displayed therein. Digital image view 410 may include a view of a digital image. In certain embodiments, the displayed digital image may include a camera image captured by camera facility 150. For example, a user of mobile device 200 may actuate selector button 210-7 or other input mechanism, and camera facility 150 may responsively capture a camera image, which may be displayed in digital image view 410 in GUI 230.

As illustrated in FIG. 4A, GUI 230 may visually indicate operations associated with "soft" input buttons 210-1 and 210-2 when the digital image view 410 is displayed. In the illustrated example, a "back" operation is associated with "soft" input button 210-1 and an "options" operation is associated with "soft" input button 210-2. When a user of mobile device 200 actuates "soft" input button 210-2 from the view shown in FIG. 4A, an "options" operation may be performed and may include providing an options window 420-1 for display in GUI 230, as shown in FIG. 4B. Options window 420-1 may include a plurality of selectable options, including options for setting a digital image as wallpaper and editing, deleting, tagging, publishing, and zooming in on a digital image. A selector 430 is also displayed in options window 420-1. Selector 430 may be navigated between the selectable options included in the options window 420-1 and used to select one of the options. For example, a user may navigate and use selector 430 to select a "tag Image" option included in options window 420-1.

Figure 4C:
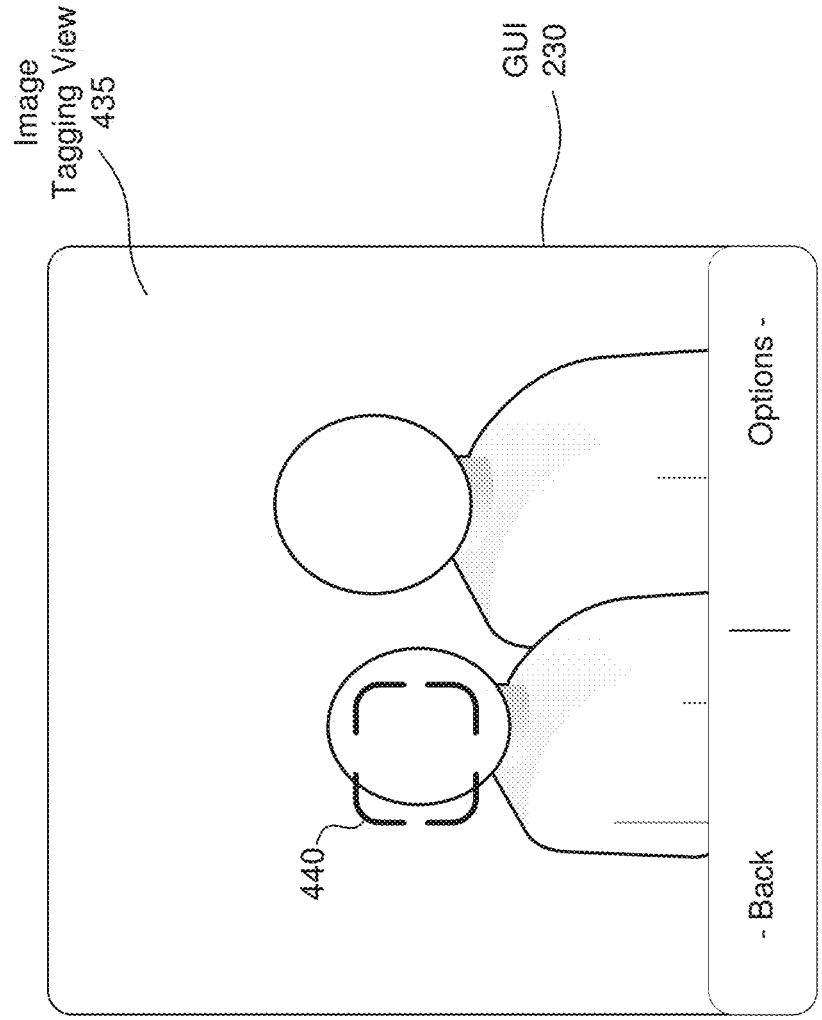

In response to user selection of the "tag Image" option, user interface facility 170 may provide an image tagging view for display in GUI 230. FIG. 4C illustrates an image tagging view 435 including a target locator 440 displayed in GUI 230. Target locator 440 may be moved within the image tagging view 435 and used to select a particular position or area of the digital image displayed in the image tagging view 435. In certain embodiments, for example, a user of mobile device 200 may utilize directional input buttons 210-8 to move target locator 440 in relation to the digital image displayed in the image tagging view 435. When target locator 440 is placed at a desired position, selector input button 210-7 may be actuated to lock target locator 440 at that position.

Figure 4D:
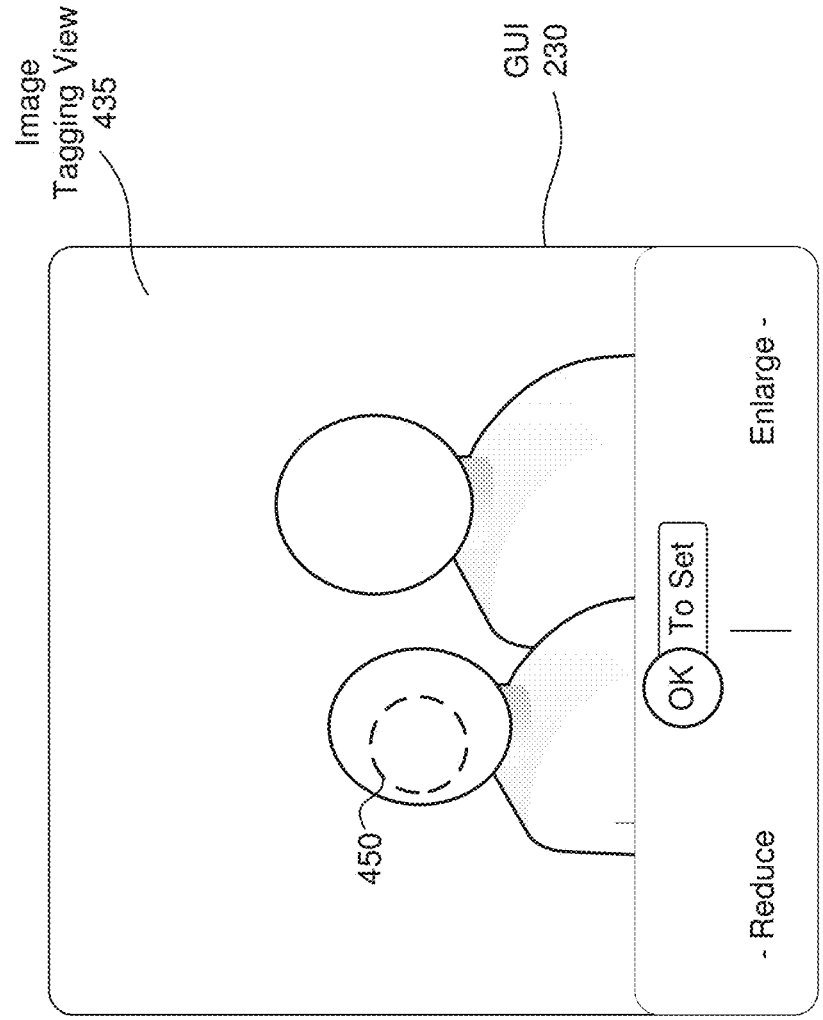

In response to target locator 440 being locked in position as described above, a sizing indicator 450 may be displayed in image tagging view 435 in GUI 230, as shown in FIG. 4D. The size of sizing indicator 450 may be adjusted based on user input. For example, GUI 230 may visually indicate operations associated with input buttons 210-1, 210-2, and 210-7 when the view shown in FIG. 4D is displayed. In the illustrated example, a "reduce" operation is associated with input button 210-1, an "enlarge" operation is associated with input button 210-2, and a "set" operation is associated with selector input button 210-7.

To illustrate, when a user of mobile device 200 actuates input button 210-2 from the view shown in FIG. 4D, user interface facility 170 may enlarge the size of the sizing indicator 450 in GUI 230. FIG. 4E illustrates the sizing indicator 450 enlarged in response to user actuation of input button 210-2 and performance of a corresponding enlarge operation. As shown, sizing indicator 450 has been enlarged relative to the digital image displayed in image tagging view 435. Accordingly, sizing indicator 450 covers a larger portion of the digital image.

When sizing indicator 450 covers a desired portion of the digital image, the sizing indicator 450 may be "set" to select the portion of the digital image located within the sizing indicator 450. For example, while the view of FIG. 4E is displayed, a user of mobile device 200 may actuate selector input button 210-7 to initiate a "set" operation, which may be performed to identify the portion of the digital image located within the sizing locator 450 as a selected portion 320 of the digital image. In the example illustrated in FIG. 4E, the selected portion 320 includes a generally circular area space within the digital image space. In this example, a portrait view of two people is displayed in the digital image, and the selected portion 320 of the digital image includes a generally circular area about one person's head.

While exemplary tools enabling a user to select a portion 320 of a digital image for tagging have been described, the examples are illustrative only. Other tools suitable for enabling a user to define a selected portion 320 of a digital image may be employed in other embodiments. For example, target locator 440 and sizing indicator 450 may be combined into one tool in other embodiments. Additional or alternative shapes, functionalities, and user inputs associated with target locator 440 and/or sizing indicator 450 may be used as may serve a particular application.

With a selected portion 320 of a digital image identified based on user input as described above, user interface facility 170 may provide one or more tools configured to enable a user to provide input defining a tag 330 to be associated with the selected portion 320 of the digital image. As an example, FIG. 4F illustrates an options window 420-2 that may be displayed in GUI 230 after a portion 320 of a digital image is selected. As shown, options window 420-2 may include a plurality of selectable options, which may be associated with respective data instances and from which a user may select a particular data instance 315 to be associated with the selected portion 320 of the digital image. In the illustrated example, the plurality of selectable options includes contact identifiers (e.g., names of persons or entities) associated with "contact" data instances stored in a contacts database. A "contact" data instance (or simply a "contact") may include information related to a person or entity, including, but not limited to a name or other identifier, physical address, phone number, fax number, email address, domain name or URL address, and/or any other information related to the person or entity. In certain embodiments, a plurality of contact data instances stored in storage facility 130 or one or more other data storage facilities may be accessed and used to populate the list of options included in options window 420-2. For example, a user of mobile device 200 may maintain a database of personal contacts, which may be accessed and used to populate options window 420-2.

Selector 430 may be displayed and used to navigate between and select options included in options window 420-2. When a user selects an option (e.g., the "contact 1" option), a data instance 315 corresponding to the selected option may be associated with tag 330. For example, when the "contact 1" option is selected, the corresponding "contact 1" data instance 315 may be associated with tag 330. The association may be made in any suitable way, such as by inserting a link to the "contact 1" data instance 315 in tag 330 and/or inserting the "contact 1" data instance 315 or a copy of information included in the "contact 1" data instance 315 in tag 330. The association between tag 330 and the selected "contact 1" data instance may be made in any suitable way, including any of the ways described above (e.g., generating a link 335 from tag 330 to the "contact 1" data instance.)

While a specific example directed to "contact" data instances has been described, the example is illustrative only and not limiting in any sense. Other data instances, and/or types of data instances, including any of those mentioned herein, may be associated with tags 330. In certain embodiments, user interface facility 170 may be configured to provide one or more tools enabling a user to select from various data instances and/or types of data instances. As an example, in response to the selected portion 320 of a digital image being selected as described above, user interface facility 170 may provide options window 420-3 for display, as illustrated in FIG. 4G. As shown, options window 420-3 may include a plurality of selectable options associated with various types of data instances that may be created and/or associated with a tag 330, including "contacts," "text," "symbol," and "location" type data instances. A "contacts" option may be associated with a contacts database, and a selection of the "contacts" option may initiate display of options window 420-2 as shown in FIG. 4F and as described above. A "text" option may be associated with a tool enabling a user to provide custom text to be associated with tag 330. Selection of the "text" option may initiate display of a text input window enabling a user to input text to be associated with a tag 330. A "symbol" option may be associated with a tool enabling a user to select a graphical object to be associated with a tag 330. Selection of the "symbol" option may initiate display of a symbol selection window enabling a user to select a graphical object to be associated with a tag 330. A "location" option may be associated with one or more geographic locations to which the digital image may be related. Selection of the "location" option may initiate display of a window including one or more selectable location options corresponding with one or more geographic locations to which digital image may be related.

As an example of associating a "location" data instance with a tag 330, mobile device 200 may be configured to detect the geographic location of the mobile device 200, such as by using GPS technologies to determine GPS coordinates for the detected location of the mobile device 200. When a digital image is acquired (e.g., captured by camera facility 150), location data representative of the geographic location of the mobile device 200 may be generated and associated with the digital image. For example, the location data may be included in the digital image metadata. Image tagging facility 160 may be configured to use the location data to selectively identify one or more "location" data instances (e.g., geographic locations and/or features) associated with the location data, and user interface facility 170 may be configured to populate a location options window with selectable "location" options corresponding to the identified "location" data instances.

For instance, camera facility 150 may capture a digital camera image at a particular detected geographic location, and corresponding location data may be inserted in the digital camera image metadata. Using the location data, image tagging facility 160 may identify one or more geographic locations and/or features associated with the location data. For example, the location data may indicate a geographic location that is located at or proximate to a particular geographic landmark, such as the Santa Monica Pier. Image tagging facility 160 may identify "Santa Monica Pier" as a "location" data instance that is related to the location data. This information may be provided to user interface facility 170, which may be configured to populate a location options window with selectable "location" options including the "Santa Monica Pier" data instance.

Image tagging facility 160 may identify "location" data instances that are related to location data (e.g., located within a predefined distance of a geographic location) in any suitable manner. In certain embodiments, for example, image tagging facility 160 is configured to communicate with a database and/or mapping application or service to request and obtain "location" data instances that are related to location data. In some examples, this may include communicating with one or more external devices (e.g., application servers).

In the above-described or similar manner, digital image metadata may be used to populate lists with selectable data instance options that are related to a digital image. This may save a user time in associating a data instance 315 to a tag 330. For example, if the selected portion 320 of a digital image includes the Santa Monica Pier or part of the Santa Monica Pier, the user may be provided with a tool for simply selecting a "Santa Monica Pier" option from a list of selectable options such that a "Santa Monica Pier" data instance is associated with tag 330.

While the above example is directed to using location metadata to populate a list of options with geographically related data instance options, this is illustrative only. Other digital image metadata (e.g., time, genre, and image settings data) may similarly be used to identify other related data instances and to populate lists of options with related data instance options that may be selected by a user for association of corresponding data instances with a tag 330.

Tag 330 may be defined to include one or more descriptors of the digital image and/or data instances to which tag 330 is associated. In certain embodiments, one or more tools may be provided enabling a user to provide descriptors for a tag 330. Tag descriptors may include a name (e.g., a name of a person associated with the "contact 1" data instance) or any other data descriptive of the selected portion 320 of the digital image, the digital image, digital image content, and data instances 315 to which the tag 330 is associated. As an example, when a user selects the "contact 1" option for association of the "contact 1" data instance with tag 330, data representative of a name associated with the "contact 1" data instance may be inserted in tag 330 as a descriptor.

Tags 330 may be searchable, and user interface facility 170 may be configured to provide a user with one or more tools for searching tags 330, and consequently for using tags 330 to search digital images. For example, a user may provide search terms in a view in GUI 230, and the search terms may be used to search tag data for matching descriptors. For instance, a user may provide a person's name as a search term, and the tag descriptors may be searched for the provided name. When a match is found, data representative of one or more tags 330 having matching descriptors may be provided, such as by displaying data representative of the tags 330 in GUI 230. Accordingly, tag descriptors may be utilized to search for tags 330 and digital images and/or selected portions of digital images associated with the tags 330. This may allow a user to conveniently search for and identify tagged digital images.

Once a user has provided input defining properties of a tag 330, image tagging facility 160 may create and define tag 330 in accordance with the user input. For example, when a user selects a data instance option (e.g., "contact 1" option) for association with a tag 330, image tagging facility 160 may create and associate tag 330 with the corresponding data instance (e.g., "contact 1" data instance), such as by defining a link 335 mapping tag 330 to the data instance as described above. With tag 330 defined, image tagging facility 160 may apply tag 330 to the selected portion 320 of the digital image as described above. Once applied, tag 330 is ready to be searched, accessed, and otherwise used in conjunction with the selected portion 320 of the digital image.

Figure 4H:
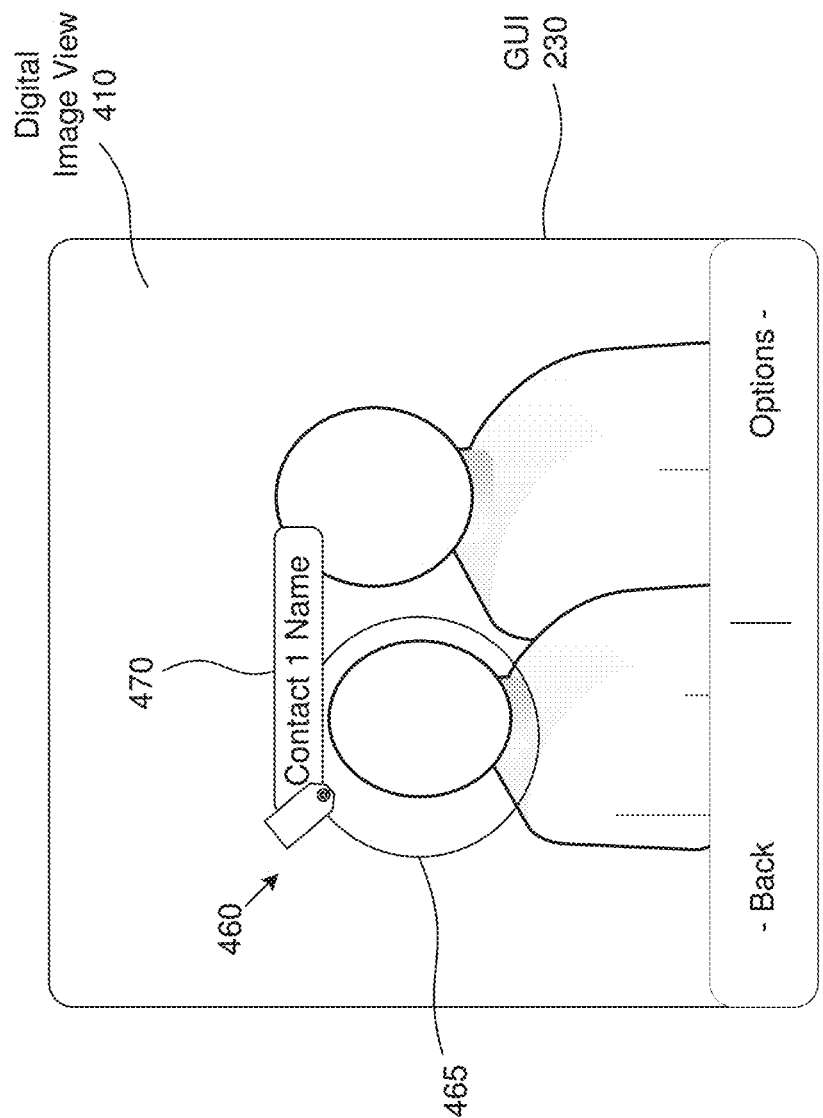

Tag 330 may be visually represented in GUI 230. When a tagged digital image is displayed in GUI 230, a visual indicator 460 may also be displayed to represent tag 330 and/or the selected portion 320 of the digital image to which tag 330 has been applied. For example, FIG. 4H illustrates an example of a visual indicator 460 representative of tag 330 displayed in digital image view 410 in GUI 230.

Visual indicator 460 may include one or more components. As shown in FIG. 4H, visual indicator 460 may include a visual component graphically positioned at and indicative of the selected portion 320 of digital image to which tag 330 is associated. In the illustrated example, visual indicator 460 includes a circular shape graphic 465 positioned at the selected portion 320 of the digital image. This example is illustrative only. Any suitable visual indicator of tag 330 may be used in other embodiments. For example, visual indicator 460 may include a boundary, marker (e.g., a tag or label symbol), and/or any other visually discernible indicator and may have any suitable size and shape. In some examples, visual indicator 460 may include one or more display attributes that provide visual contrast to other portions (e.g., non-selected portions) of the digital image, including a contrasting brightness, shading, or highlight.

In certain embodiments, the visual indicator 460 may include an information component 470, which may display one or more descriptors associated with tag 330. For instance, an information component may include a name for a data instance 315 to which tag 330 is associated. As shown in FIG. 4H, for example, a name (e.g., "Jane Doe") associated with the "contact 1" data instance 315 may be displayed as part of visual indicator 460. This example is illustrative only. Other descriptors associated with the data instance 315 may be displayed in other embodiments. In certain embodiments, for example, a visual indicator representative of a service (e.g., a social network site) associated with the "contact 1" data instance 315 may be displayed and may be indicative that the person represented by the "contact 1" data instance 315 uses the service. For instance, a graphical symbol representative of a particular social network site may be displayed as part of visual indicator 460.

In certain examples, a visual indicator 460, or one or more components of a visual indicator 460, associated with tag 330 may be automatically displayed together with the corresponding digital image in digital image view 410. In certain other examples, visual indicator 460, or one or more components of visual indicator 460, may be displayed in response to an occurrence of a predefined event, such as user selection of (e.g., hovering a cursor over) the selected portion 320 of the digital image. In certain other examples, a component of the visual indicator 460 may be displayed in response to the occurrence of a predefined event, and another component of the visual indicator 460 may be displayed in response to the occurrence of another predefined event. In FIG. 4H, for example, a component of visual indicator 460 visually indicating the selected portion 320 of the digital image (e.g., a circular shape graphic) may be displayed automatically along with the displayed digital image. The "contact" name or other information associated with the "contact 1" data instance 315 may be displayed in response to an occurrence of a predefined event, such as a user selection of the displayed component and/or the selected portion 320 of the digital image. For instance, a cursor may be placed over the displayed shape graphic component and/or selected portion 320 for at least a predetermined length of time, and in response the "contact" name graphic component may be displayed together with the shape graphic component in camera image view 410 as shown in FIG. 4H.

A displayed visual indicator representative of tag 330 may be selectable. Accordingly, a user may select the visual indicator 460, and one or more operations may be performed in response to the visual indicator 460 being selected. When a user selects visual indicator 460 in FIG. 4H, for example, the "contact 1" data instance may be displayed in GUI 230.

A tagged digital image may be published. When a user of mobile device 200 actuates input button 210-2 from the view shown in FIG. 4H, for example, user interface facility 170 may perform an "options" operation such as providing options window 420-1 for display in GUI 230. FIG. 4I illustrates options window 420-1 displayed in GUI 230 and in which selector 430 is positioned at a "publish image" option. In response to a user selection of the "publish image" option, publishing facility 180 may publish the tagged digital image displayed in FIG. 4H. Publishing of a tagged digital image may include sending data representative of the tagged digital image from mobile device 200 to one or more other devices (e.g., other mobile devices 200), or to other destinations such as a website and/or a social networking site (e.g., a user's page on a social networking site). In certain embodiments, publishing of the tagged digital image includes providing data representative of the tagged digital image over a network to a digital image storage and access subsystem, which may be configured to provide one or more access devices with access to the tagged digital image.

FIG. 5 illustrates an exemplary digital image publishing and access system 500 (or simply "system 500"). As shown in FIG. 5, system 500 may include a digital image storage and access subsystem 510 selectively and communicatively connected to a plurality of access devices 520-1 through 520-K (collectively "access devices 520") by way of a network 525.

Access devices 520 and digital image storage and access subsystem 510 may communicate over network 525 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications networks and technologies.

Network 525 may include one or more networks, including, but not limited to, wireless networks, mobile telephone networks (e.g., cellular telephone networks), closed media networks, open media networks, closed communication networks, open communication networks, satellite networks, navigation networks, broadband networks, narrowband networks, voice communications networks (e.g., VoIP networks), the Internet, wide area networks, local area networks, public networks, private networks, and any other networks capable of carrying data and/or communications signals between access devices 520 and digital image storage and access subsystem 510. In certain exemplary embodiments, network 525 includes a mobile telephone network, and digital image storage and access subsystem 510 and access devices 520, which may include one or more mobile devices 200, are configured to communicate with one another using mobile phone communication technologies.

In some examples, system 500 may include any computer hardware and/or instructions (e.g., software programs), or combinations of software and hardware, configured to perform the processes described herein. In particular, it should be understood that components of system 500 may be implemented on one physical computing device or may be implemented on more than one physical computing device. Accordingly, system 500 may include any one of a number of computing devices and/or computer operating systems (e.g., mobile device operating systems).

Accordingly, the digital image publishing, storage, and access processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media, including any of the computer-readable media described above.

Access devices 520 may include any devices in which the system 100 of FIG. 1 may be implemented and may include one or more mobile devices 200. Accordingly, access devices 520 may be configured to apply tags 330 to selected portions 320 of digital images as described above and publish data representative of tagged digital images to digital image storage and access subsystem 510. Alternatively or additionally, access devices 520 may be used to access tagged digital images stored at digital image storage and access subsystem 510, as well as data instances associated with tags 330. As an example, in response to a user selecting the "publish image" option shown in FIG. 4I, mobile device 200 may provide data representative of a tagged digital image over network 525 to digital image storage and access subsystem 510, which may store the data and provide one or more access devices 520 with access to the data.

Figure 6:
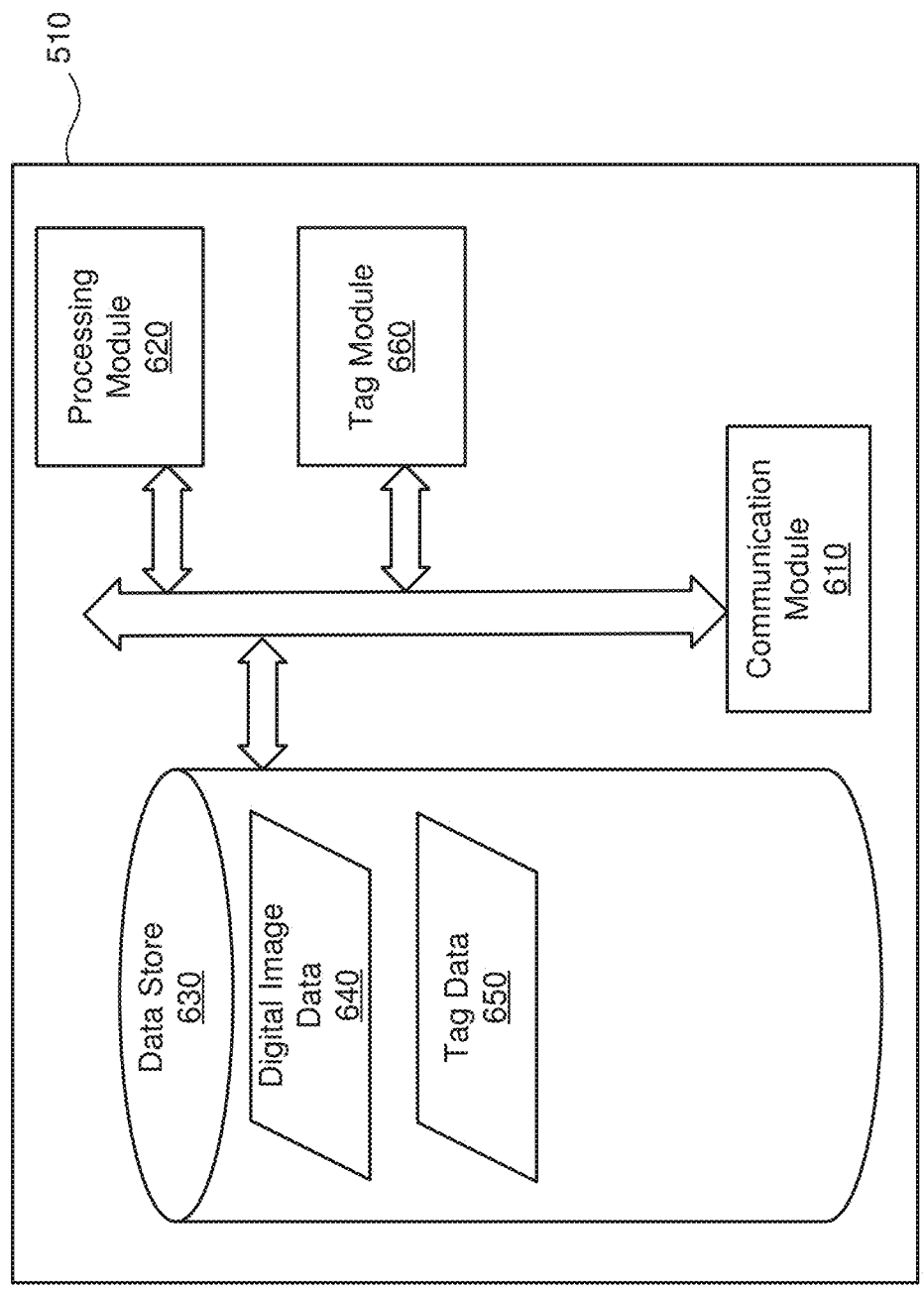
FIG. 6 illustrates an exemplary digital image storage and access subsystem.

FIG. 6 illustrates an exemplary digital image storage and access subsystem 510. The components of digital image storage and access subsystem 510 may include or be implemented as hardware, computing instructions (e.g., software) embodied on one or more computer-readable media, or a combination thereof. In certain embodiments, for example, one or more components of digital image storage and access subsystem 510 may include or be implemented on at least one server configured to communicate over network 525. While an exemplary digital image storage and access subsystem 510 is shown in FIG. 6, the exemplary components illustrated in FIG. 6 are not intended to be limiting. Indeed, additional or alternative components and/or implementations may be used.

As shown in FIG. 6, digital image storage and access subsystem 510 may include a communication module 610, which may be configured to communicate with access devices 520, including receiving data representative of tagged digital images from one or more access devices 520 and providing data representative of the tagged digital images to one or more access devices 520 over network 525. Communication module 610 may be configured to support a variety of communication platforms, protocols, and formats such that digital image storage and access subsystem 510 can receive and distribute tagged digital image data from/to a variety of computing platforms (e.g., a mobile telephone service platform, a web-based platform, a subscriber television platform, etc.) and using a variety of communications technologies. Accordingly, the digital image storage and access subsystem 510 can support a multi-platform system in which tagged digital images can be received from and provided to diverse platforms.

Digital image storage and access subsystem 510 may include a processing module 620 configured to control operations of components of the digital image storage and access subsystem 510. Processing module 620 may execute or direct execution of operations in accordance with computer-executable instructions stored to a computer-readable medium such as a data store 630. As an example, processing module 620 may be configured to process (e.g., encode, decode, modulate, and/or demodulate) data and communications received from or to be transmitted to access devices 520. As another example, processing module 620 may be configured to perform data management operations on data stored in data store 630. For example, processing module 620 may operate on data, including storing data to data store 630 and indexing, searching, accessing, retrieving, modifying, annotating, copying, and/or deleting data stored in data store 630.

Data store 630 may include one or more data storage media, devices, or configurations and may employ any type, form, and combination of storage media. For example, the data store 630 may include, but is not limited to, a hard drive, network drive, flash drive, magnetic disc, optical disc, random access memory ("RAM"), dynamic RAM ("DRAM"), other non-volatile and/or volatile storage units, or a combination or sub-combination thereof. Data store 630 may store any suitable type or form of electronic data, including digital image data 640 and tag data 650.

Digital image data 640 may include data representative of one or more digital images, including tagged digital images received from one or more access devices 520 over network 525. The digital images may include any form or type of digital images, including those described above. Digital image data 640 may further include data related to digital images, such as digital image metadata, for example.

Tag data 650 may include data representative of one or more tags 330 associated with tagged digital images represented in the digital image data 640. For example, tag data 650 may include one or more tag data objects, references to selected portions 320 of digital images, references to one or more data instances 315, data instances 315 or copies of data instances 315, tag descriptors, and any other data associated with tags 330.

As shown in FIG. 6, digital image storage and access subsystem 510 may further include a tag module 660, which may include or be implemented as hardware, computing instructions (e.g., software) tangibly embodied on a computer-readable medium, or a combination of hardware and embodied computing instructions configured to perform one or more of the tagged digital image storage, management, update, and access operations described herein. In certain embodiments, tag module 660 may be implemented as a software application embodied on a computer-readable medium such as data store 630 and configured to direct the processing module 620 to execute one or more of the processes described herein.

As an example of operations performed by tag module 660, digital image storage and access subsystem 510 may receive data representative of a tagged digital image from an access device 520-1 over network 525. Tag module 660 may store data representative of the tagged digital image as digital image data 640 and/or tag data 650 in data store 630.

Tag module 660 may be further configured to provide access to the stored, tagged digital image. For example, a user of access device 520-2 may provide search parameters to digital image storage and access subsystem 510. Tag module 660 may use the search parameters to search within the digital image data 640 and/or the tag data 650 and identify any data that may match one or more of the search parameters. For instance, the search parameters may include a name of a person. If the name of the person is associated with a tag 330, data representative of the tag 330 and/or the corresponding tagged digital image may be identified and provided to access device 520-2 over network 525 in response to the search.

A user of access device 520-2 may utilize any features of system 100 described above to view, update, annotate, tag, or otherwise process the tagged digital image. As an example, the user may wish to add another tag 330 to the digital image. This may be accomplished as described above, including the user utilizing one or more of the GUI views described above to define a selected 320 portion of the digital image and a tag 330 to be applied to the selected portion 320 of the digital image. For instance, the user may tag a shirt worn by a person in the digital image and associate textual data with the tag 330, such as, "Great shirt! Where did you get it?" Another user of another access device (e.g., access device 530-K) may add yet another tag 330 to the digital image to respond to the question, such as, "Thanks. Got it at Macy's." In this or similar manner, one or more tags 330 may be applied to various selected portions 320 of a digital image. In this or similar manner, tagged digital photos and/or tags 330 applied to digital photos may be used as a platform for communication threads between one or more users.

When additional tags 330 are applied to a digital image, data representative of the tagged digital image and/or updates to the tagged digital image may be provided to digital image storage and access subsystem 510 over network 525. Tag module 660 may use the received data and update digital image data 640 and/or tag data 650 accordingly.

In certain embodiments, tag module 660 may be selectively configured to prevent tagged digital images from being updated with additional tags 330. In this manner, a user may protect or lock a digital image from being tagged or otherwise modified by other users. To this end, when a user tags a digital image, the user may be allowed to select an option to block updates to the tagged digital image. Tag module 660 may be configured to recognize an "update block" command for a tagged digital image and prevent updates from being applied to the tagged digital image.

In certain embodiments, tag module 660 may be configured to apply one or more properties to tags 330, which properties may be used to selectively search and access tags 330. For examples, tags 330 may be associated with one or more user profiles, such as user profiles corresponding to the users who created the tags 330. Accordingly, a view of tags 330 associated with a particular user profile may be selected and displayed. For instance, a user of access device 520-1 may select to view tags 330 and/or image maps associated with the particular user profile. When the user of access device 520-1 views a tagged digital image, only tags 330 associated with the selected user profile will be displayed. In this manner, a user may filter out other tags 330 that have been applied to a digital image.

Figure 7:
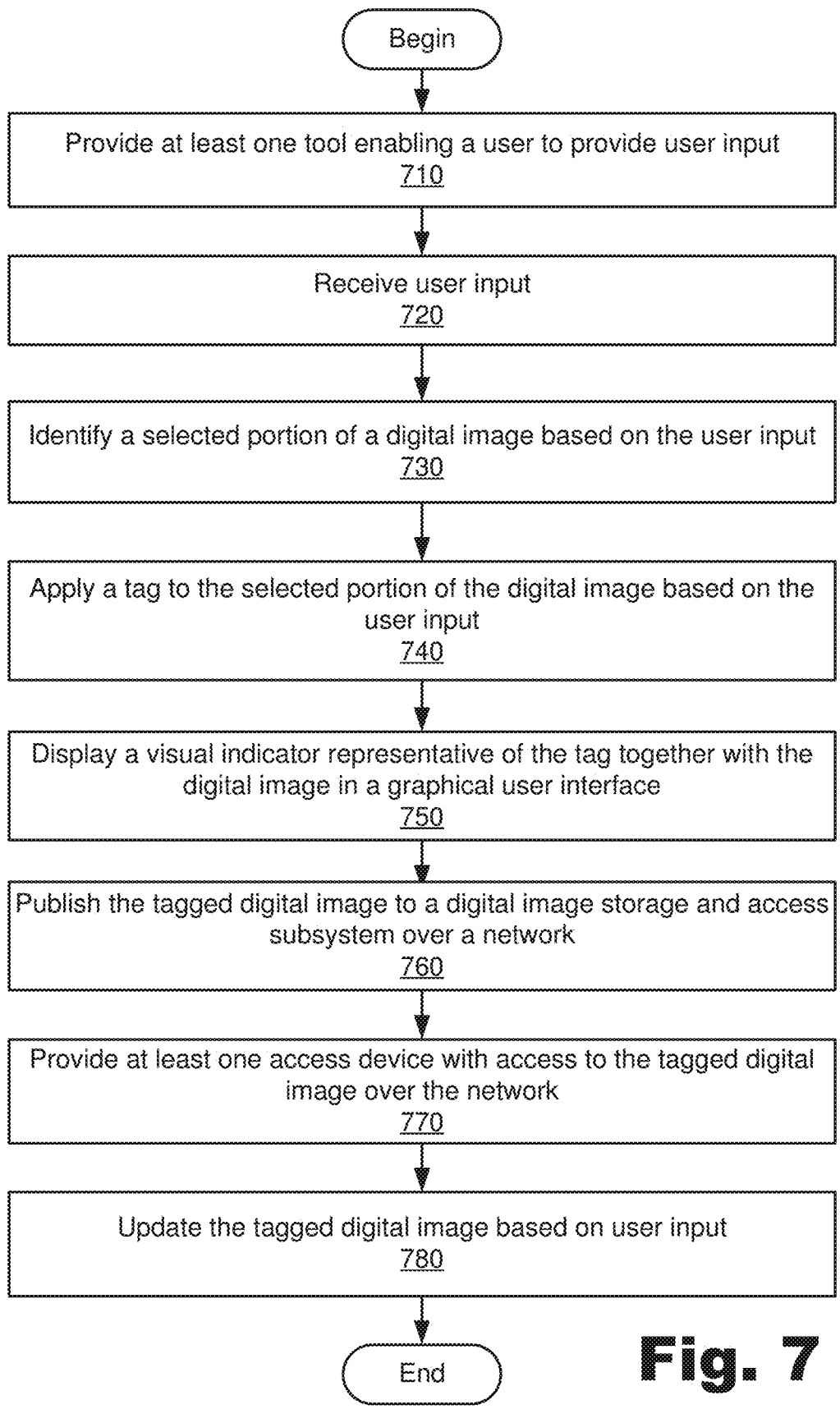
FIG. 7 illustrates an exemplary digital image tagging method.

FIG. 7 illustrates an exemplary digital image tagging method. While FIG. 7 illustrates exemplary steps according to one embodiment, other embodiments may omit, add to, reorder, and/or modify any of the steps shown in FIG. 7.

In step 710, at least one tool enabling a user to provide user input is provided. Step 710 may be performed in any of the ways described above, including user interface facility 170 providing GUI 230 and one or more views (e.g., image tagging views 435 in GUI 230) for display to a user. GUI 230 may include one or more tools configured to enable the user to provide user input defining a selected portion 320 of a digital image and a tag 330 to be applied to the selected portion 320 of the digital image.

In step 720, user input is received. Step 720 may be performed in any of the ways described above, including user interface facility 170 receiving user input by way of GUI 230.

In step 730, a selected portion of a digital image is identified based on the user input. Step 730 may be performed in any of the ways described above, including image tagging facility 160 using the user input to identify, generate, and/or store data representative of the selected portion 320 of the digital image.

In step 740, a tag is applied to the selected portion of the digital image based on the user input. Step 740 may be performed in any of the ways described above, including image tagging facility 160 using the user input to identify, generate, and/or associate data representative of tag 330 to the selected portion 320 of the digital image. As described above, step 740 may include generating an image map including tag 330 mapped to the selected portion 320 of the digital image, inserting a link to and/or data representative of tag 330 and assigned to the selected portion 320 of the digital image in the digital image metadata.

In step 750, a visual indicator representative of the tag is displayed together with the digital image in a graphical user interface. Step 750 may be performed in any of the ways described above, including user interface facility 170 providing data representative of the visual indicator 460 for display in GUI 430 together with the tagged visual image, such as is shown in FIG. 4H. In certain embodiments, the visual indicator visually indicates the selected portion 320 of the digital image to which the tag 330 is associated.

In step 760, the tagged digital image is published to a digital image storage and access subsystem 510 over network 525. Step 760 may be performed in any of the ways described above, including an access device 520-1 transmitting data representative of the tagged digital image to the digital image storage and access subsystem 510.

In step 770, at least one access device 520 is provided with access to the tagged digital image over the network 525. Step 770 may be performed in any of the ways described above.

In step 780, the tagged digital image is updated based on user input. Step 780 may be performed in any of the ways described above, including repeating steps 710-770 to allow a user to define another selected portion 320 of the digital image and another tag 330 to be applied to the other selected portion 320. Steps 710-770 may be repeated for each new tag 330 applied to a selected portion of the digital image.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a mobile device, user input that defines a portion of a digital image;
selecting, by the mobile device, the portion of the digital image defined by the user input as a selected portion of the digital image;
providing, by the mobile device for presentation to a user after the selecting of the portion of the digital image as the selected portion of the digital image, a list of selectable options associated with respective data instances;
receiving, by the mobile device, a user selection of a particular selectable option included in the list of selectable options, the particular selectable option associated with a contact data instance included in the data instances;
applying, by the mobile device in response to the receiving of the user selection of the particular selectable option, a tag to the selected portion of the digital image, the applied tag providing an association between the selected portion of the digital image and the contact data instance associated with the particular selectable option;
providing, by the mobile device, the tagged digital image for display in a digital image view of a graphical user interface;
providing, by the mobile device, a visual indicator representative of the tag for display together with the tagged digital image in the digital image view of the graphical user interface, the visual indicator including an indication of a contact associated with the contact data instance;
receiving, by the mobile device, additional user input that initiates a search based on a name of the contact associated with the contact data instance; and
receiving, by the mobile device based the additional user input, search results identifying one or more additional tagged digital images in which the contact associated with the contact data instance is tagged.

2. The method of claim 1, wherein:
the list of selectable options associated with the respective data instances comprises a list of contact identifiers associated with respective contact data instances stored in a contacts database; and
the contact data instance corresponds to a particular contact data instance included in the contact data instances.

3. The method of claim 1, wherein:
the list of selectable options associated with the respective data instances comprises a list of location options associated with respective location data instances that represent a plurality of geographic locations related to a geographic location where the digital image was captured; and the contact data instance is associated with a particular location data instance included in the location data instances and that represents a particular geographic location related to the geographic location where the digital image was captured.

4. The method of claim 1, wherein the applying of the tag to the selected portion of the digital image comprises generating an image map that maps the tag to the selected portion of the digital image, the tag including a link to the contact data instance.

5. The method of claim 1, wherein the visual indicator includes at least one display attribute that provides visual contrast relative to at least one non-selected portion of the digital image.

6. The method of claim 1, wherein:
the visual indicator further includes a graphical symbol representative of a service associated with the contact;
the contact associated with the contact data instance is a person; and
the service represented by the graphical symbol corresponds to a service used by the person.

7. The method of claim 6, wherein the service used by the person corresponds to a social networking service.

8. The method of claim 1, further comprising:
publishing the tagged digital image to a digital image storage and access subsystem over a network; and
providing a plurality of access devices with access to the tagged digital image over the network, wherein the access includes providing the visual indicator representative of the tag for display together with the tagged digital image in a graphical user interface of one or more of the plurality of access devices.

9. The method of claim 1, tangibly embodied as computer-executable instructions on at least one non-transitory computer-readable medium.

10. A method comprising:
receiving, by a mobile device, user input that defines a portion of a digital image;
selecting, by the mobile device, the portion of the digital image defined by the user input as a selected portion of the digital image;
providing, by the mobile device for presentation to a user after the selecting of the portion of the digital image as the selected portion of the digital image, a list of selectable options representative of a plurality of different types of data instances;
receiving, by the mobile device, a user selection of a particular selectable option included in the list of selectable options, the particular selectable option associated with a particular type of data instance included in the plurality of different types of data instances;
providing, by the mobile device in response to the user selection of the particular selectable option, a tool for use by the user to select a particular data instance of the particular type of data instance;
receiving, by the mobile device, a user selection of the particular data instance of the particular type of data instance, the particular data instance comprising a contact data instance;
applying, by the mobile device in response to the user selection of the particular data instance of the particular type of data instance, a tag to the selected portion of the digital image, the applied tag providing an association between the selected portion of the digital image and the particular data instance of the particular type of data instance;
providing, by the mobile device, the tagged digital image for display in a digital image view of a graphical user interface;
providing, by the mobile device, a visual indicator representative of the tag for display together with the tagged digital image in the digital image view of the graphical user interface, the visual indicator including an indication of a contact associated with the contact data instance;
receiving, by the mobile device, additional user input that initiates a search based on a name of the contact associated with the contact data instance; and
receiving, by the mobile device based on the additional user input, search results identifying one or more additional tagged digital images in which the contact associated with the contact data instance is tagged.

11. The method of claim 10, wherein the list of selectable options representative of a plurality of the plurality of different types of data instances comprises a contacts option representative of contacts type data instances and at least one of:
a text option representative of text type data instances;
a symbol option representative of symbol type data instances; and
a location option representative of location type data instances.

12. The method of claim 10, wherein:
the visual indicator further includes a graphical symbol representative of a service associated with the contact;
the contact associated with the contact data instance is a person; and
the service represented by the graphical symbol corresponds to a service used by the person.

13. The method of claim 12, wherein the service used by the person corresponds to a social networking service.

14. The method of claim 10, tangibly embodied as computer-executable instructions on at least one non-transitory computer-readable medium.

15. A system comprising:
a mobile device that:
receives user input that defines a portion of a digital image;
selects the portion of the digital image defined by the user input as a selected portion of the digital image;
provides, for presentation to a user after the selecting of the portion of the digital image as the selected portion of the digital image, a list of selectable options associated with respective data instances;
receives a user selection of a particular selectable option included in the list of selectable options, the particular selectable option associated with a contact data instance included in the data instances;
applies, in response to the user selection of the particular selectable option, a tag to the selected portion of the digital image, the applied tag providing an association between the selected portion of the digital image and the contact data instance associated with the particular selectable option; and
publishes the tagged digital image; and
a digital image storage and access subsystem that:
receives, over a network, data representative of the tagged digital image published by the mobile device;
provides a plurality of access devices with access to the tagged digital image over the network, wherein the access includes providing a visual indicator representative of the tag for display together with the tagged digital image in a digital image view of a graphical user interface, the visual indicator including a name of a contact associated with the contact data instance; and searches, based on the name of the contact associated with the contact data instance, for one or more additional tagged digital images in which the contact is tagged and that include the name of the contact associated with the contact data instance.

16. The system of claim 15, wherein:

the list of selectable options associated with the respective data instances comprises a list of contact identifiers associated with respective contact data instances stored in a contacts database; and the contact data instance corresponds to a particular contact data instance included in the contact data instances.

17. The system of claim 15, wherein:

the list of selectable options associated with the respective data instances comprises a list of location options associated with respective location data instances that represent a plurality of geographic locations related to a geographic location where the digital image was captured; and the contact data instance is associated with a particular location data instance included in the location data instances and that represents a particular geographic location related to the geographic location where the digital image was captured.

18. The system of claim 15, wherein the mobile device:

provides the tagged digital image for display on a display screen of the mobile device; and provides the visual indicator representative of the tag for display together with the tagged digital image on the display screen of the mobile device.

19. The system of claim 18, wherein the visual indicator includes at least one display attribute that provides visual contrast relative to at least one non-selected portion of the digital image.

20. The system of claim 15, wherein the mobile device:

provides the tagged digital image for display on a display screen of the mobile device; and provides the visual indicator representative of the tag for display together with the tagged digital image on the display screen of the mobile device;

wherein the visual indicator further includes a graphical symbol representative of a service associated with the contact;

wherein the contact associated with the contact data instance is a person; and wherein the service represented by the graphical symbol corresponds to a social networking service used by the person.

* * * * *